United States Patent
Schrötter et al.

(10) Patent No.: US 9,965,752 B2
(45) Date of Patent: May 8, 2018

(54) METHOD FOR DISPLAYING A SPORTING EVENT AND PRINTING A TRANSACTION RECEIPT

(75) Inventors: Florain Schrötter, Traiskirchen (AT); Harald Kaiblinger, Pfaffstätten (AT)

(73) Assignee: Novomatic AG, Gumpoldskirchen (AT)

( * ) Notice: Subject to any disclaimer, the term of this patent is extended or adjusted under 35 U.S.C. 154(b) by 61 days.

(21) Appl. No.: 13/007,648

(22) Filed: Jan. 16, 2011

(65) Prior Publication Data
US 2012/0185344 A1    Jul. 19, 2012

(51) Int. Cl.
| | |
|---|---|
| G06G 1/12 | (2006.01) |
| G06Q 20/00 | (2012.01) |
| G06Q 20/20 | (2012.01) |
| G07F 17/32 | (2006.01) |

(52) U.S. Cl.
CPC .......... G06Q 20/20 (2013.01); G06Q 20/202 (2013.01); G06Q 20/209 (2013.01); G07F 17/3244 (2013.01); G07F 17/3288 (2013.01)

(58) Field of Classification Search
None
See application file for complete search history.

(56) References Cited

U.S. PATENT DOCUMENTS

| | | | | |
|---|---|---|---|---|
| 5,687,087 A | * | 11/1997 | Taggart | 700/233 |
| 5,859,416 A | * | 1/1999 | Gatto | 235/384 |
| 6,015,345 A | * | 1/2000 | Kail | 463/16 |
| 6,550,671 B1 | * | 4/2003 | Brown et al. | 235/379 |
| 6,947,902 B2 | * | 9/2005 | Shah et al. | 705/7.33 |
| 7,031,945 B1 | * | 4/2006 | Donner | 705/64 |

(Continued)

FOREIGN PATENT DOCUMENTS

| | | |
|---|---|---|
| DE | 4009980 A1 | 10/1991 |
| GB | 2402238 A | 12/2004 |

(Continued)

*Primary Examiner* — Fateh M Obaid
(74) *Attorney, Agent, or Firm* — Kevin H. Fortin

(57) ABSTRACT

A point of sale system and method for consummating sales transactions and enabling sporting event betting. The point of sale system includes a cash register, an event server, and a customer interface. The cash register consummates point of sale transactions and accepts cash, credit and debit payments. The event server communicates with the cash register for communicating sporting event choices to the cash register. The customer interface communicates with the cash register and includes a display for displaying at least one of said sporting event choices to a customer. The customer interface includes an input module for enabling a customer to select at least one of said sporting event choices and for enabling a customer to place a wager on the selected sporting event choice. The system also includes a printer in communication with the cash register to print a transaction receipt including a description of the selected sporting event choice and the wager. The point of sale system communicates with a risk management server that calculates the odds of each wager. In one embodiment of the invention, the wager, the odds and a description of the sporting event are printed on the receipt in addition to the point of sale transactional information such descriptions of items purchased, cost of each item, subtotal, tax and total.

6 Claims, 3 Drawing Sheets

(56) References Cited

U.S. PATENT DOCUMENTS

| | | |
|---|---|---|
| 7,162,454 B1 * | 1/2007 | Donner et al. .................. 705/64 |
| 7,280,975 B1 * | 10/2007 | Donner ............................ 705/5 |
| 2003/0207708 A1 | 10/2003 | Sadri et al. |
| 2005/0179251 A1 * | 8/2005 | Wagoner et al. ............ 283/60.1 |
| 2005/0233797 A1 * | 10/2005 | Gilmore et al. ................ 463/17 |
| 2006/0024694 A1 | 11/2006 | Walker et al. |
| 2008/0132314 A1 | 6/2008 | Robb et al. |
| 2008/0207296 A1 | 8/2008 | Lutnick |
| 2008/0248874 A1 | 10/2008 | Pajor et al. |
| 2009/0221343 A1 * | 9/2009 | Ekisheva et al. ............... 463/17 |
| 2009/0271322 A1 | 10/2009 | Lay |
| 2010/0094722 A1 * | 4/2010 | Cella et al. .................... 705/26 |
| 2010/0120520 A1 * | 5/2010 | Roemer et al. ................. 463/25 |

FOREIGN PATENT DOCUMENTS

| | | |
|---|---|---|
| WO | 2004107286 A1 | 12/2004 |
| WO | 2005106811 A1 | 11/2005 |
| WO | 2009085020 A1 | 7/2009 |
| WO | 2009101555 A1 | 8/2009 |
| WO | WO 2009/101555 A1 | 8/2009 |

\* cited by examiner

METHOD FOR DISPLAYING A SPORTING EVENT AND PRINTING A TRANSACTION RECEIPT

RELATED APPLICATIONS

This invention relates in subject matter to U.S. patent application Ser. No. 12/945,852, filed 13 Nov. 2010.

FIELD OF THE INVENTION

The present invention relates to systems and methods for sporting event betting.

BACKGROUND OF THE INVENTION

Live sporting events entertain and attract millions of remote viewers. Many are broadcast via satellite worldwide. Some viewers prefer racing events, such as horse races or automotive races. Others prefer sports-team events including football, baseball, basketball, and soccer. When an international or championship sporting event is played, viewers frequently express great enthusiasm for their favorite team.

It is not uncommon for viewers to also enjoy betting on the results of their favorite sporting events. Proponents of sports betting generally regard it as a hobby for sports fans that increases their interest in particular sporting events, thus benefiting the leagues, teams and players they bet on through higher attendances and television audiences. Many agree that socialization among sports fans results both from a shared common interest in a particular sporting event, and from a shared common interest in predicting the results of the sporting event.

Sports event enthusiasts would like to have better access to sporting event betting to increase the entertainment value of such events. Accordingly, there is a need to expand the variety and locations where sporting event betting can occur.

Sporting event betting terminals have been developed, which are commonly placed in public locations where betting is permitted, including malls, shops, and grocery stores. Such betting terminals are increasing in popularity, but standalone kiosks may be expensive to build, distribute, maintain and operate.

In recent years, the seemingly distinct boundary between point of sale terminals and gaming machines has dissipated. This is evidenced by recent technical publications.

US Patent Application Publication No. US20100120520 to Roemer et al., for example, discloses a point-of-sale gaming system. The system comprises a point of sale device and a gaming machine in communication with a point of sale device. A credit for change given at the point of sale is transferred to the gaming machine as a wager. Winnings are paid via the point of sale device, such as in the form of money from a cash register, or in the form of a redeemable winnings receipt.

While the Roemer system represents a step forward in the art, it has no mechanism to enable betting on sporting events. Additionally, the concept of throughput time for point of sale transactions is not adequately addressed. This can result in time delays and inconvenience for a user of such a system and/or additional users that are waiting in a check-out line.

International Patent Application Publication No. WO2009/101555A1 to Ekisheva et al. discloses a way of using change given at a point of sale terminal as a stake in a lottery. Like the Romer et al. system, there is no mechanism to facilitate sporting event betting.

There is a need to provide new betting opportunities at a point of sale location, which is cost-effective and which does not significantly increase the average point of sale transaction time.

SUMMARY OF THE INVENTION

The present invention includes a point of sale system and method for consummating sales transactions and enabling sporting event betting. The point of sale system includes a cash register, an event server, a risk management server and a customer interface.

The cash register consummates point of sale transactions and accepts cash, credit and debit payments. The event server communicates with the cash register for communicating sporting event choices to the cash register. The customer interface communicates with the cash register and includes a display for displaying at least one of the sporting event choices to a customer. The customer interface includes an input module for enabling a customer to select at least one of said sporting event choices and for enabling a customer to place a wager on the selected sporting event choice. Preferably the customer interface also includes a card reader for reading credit and debit cards, RFID cards and other near field communication-based payment devices.

The system also includes a printer and a bar code reader in communication with the cash register. The printer prints a transaction receipt including a description of the selected sporting event choice and the wager. Preferably, the system encodes the selected sporting event choice and the wager on a barcode, which is printed on the receipt. The bar code reader reads the barcode to enable payout for successful customers.

The point of sale system communicates with the risk management server that calculates the odds of each wager. In one embodiment of the invention, the odds are printed on the receipt in addition to the point of sale transactional information. Typical point of sale transactional information includes a description of each item purchased, cost of each item, subtotal, tax and total.

The odds calculation depends on the sort of sporting event, on the type of bet placed, and in some instance, on the amount of the bet.

Depending on the time intervals of the sporting events, the customer may wait for the betting results still at the point of sale venue, where the sporting event may be displayed on a remote monitor, for example. Alternatively, the customer may request the results of the wager at a later time. For example, using the information printed on the receipt, a customer could later access a web page via the Internet to discover the result of any wager. Mobile access to the webpage is also contemplated. Further the system is capable of generating text messages and emails to inform customers of the result of the wager.

DETAILED DESCRIPTION

Figure 1:
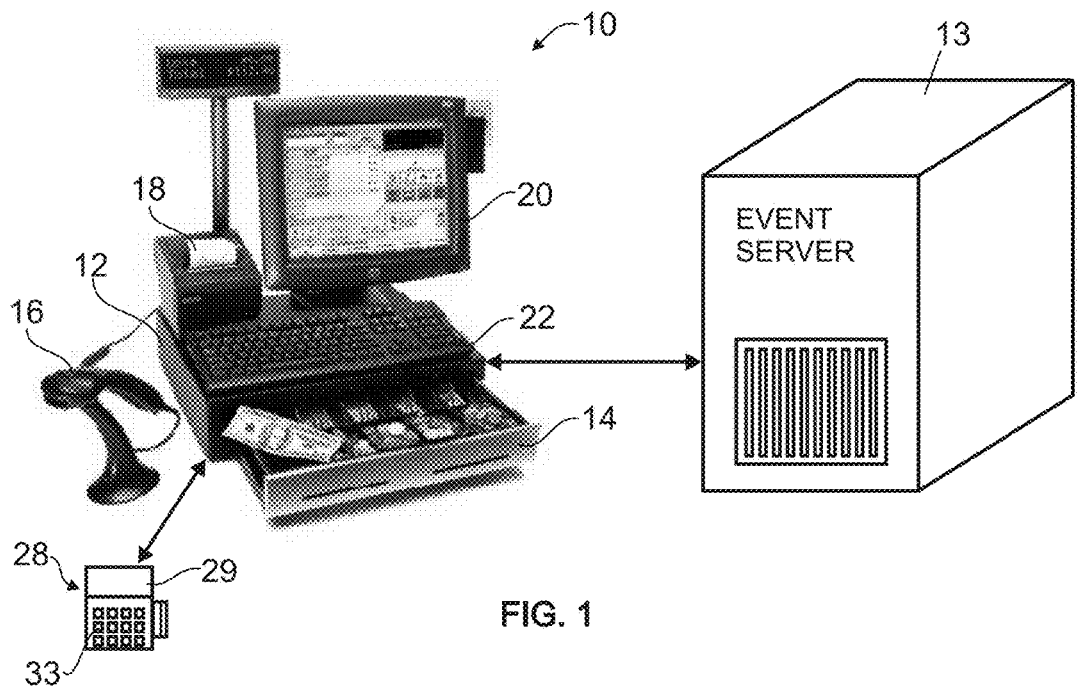
FIG. 1 shows a point of sale system including a cash register and a customer interface.

FIG. 1 shows a point of sale terminal including a cash register 12 connected to an event server 13 via a network connection. The point of sale terminal 10 connects with a customer interface 28 including a card reader for reading credit cards, debit cards, and RFID cards and devices including smart cards. The customer interface 28 further includes a display 29 and a keypad 33.

The cash register 12 includes a cash drawer 14, a UPC (uniform product code) code scanner 16, a printer 18 for printing receipts, and at least one cash register display 20. The cash register 12 also includes a cash register keypad 22. The UPC code scanner 16 scans barcodes that identify products.

The customer interface 28 also includes a card reader that enables rapid input of credit and debit account information, and enables swiping of a club card. The keypad 33 enables input of alpha-numeric information to allow a customer to input pin numbers or other information linking transactions to that customer.

For example, the customer interface 28 enables a customer to consummate transactions, input retail club membership indicia, such as a phone number or electronic address associated with a club membership account. It can be appreciated that the keypad 33, and display 29 may comprise either a single touch-sensitive display unit, or may comprise discrete components of the card reader 28.

The cash register 12 includes an internal computer coupled with the cash register display 20, the printer 18, the UPC code scanner 16 and the cash register keypad 22. The computer 24 is capable of performing routine calculations and interface operations.

The UPC code scanner 16, in one embodiment, includes an RFID reader to read RFID tags and input product information and other data commonly used at point of sale terminals. The customer interface 28, in an alternate embodiment, includes an RFID reader to read smart cards or other payment device presented by a customer.

Figure 2:
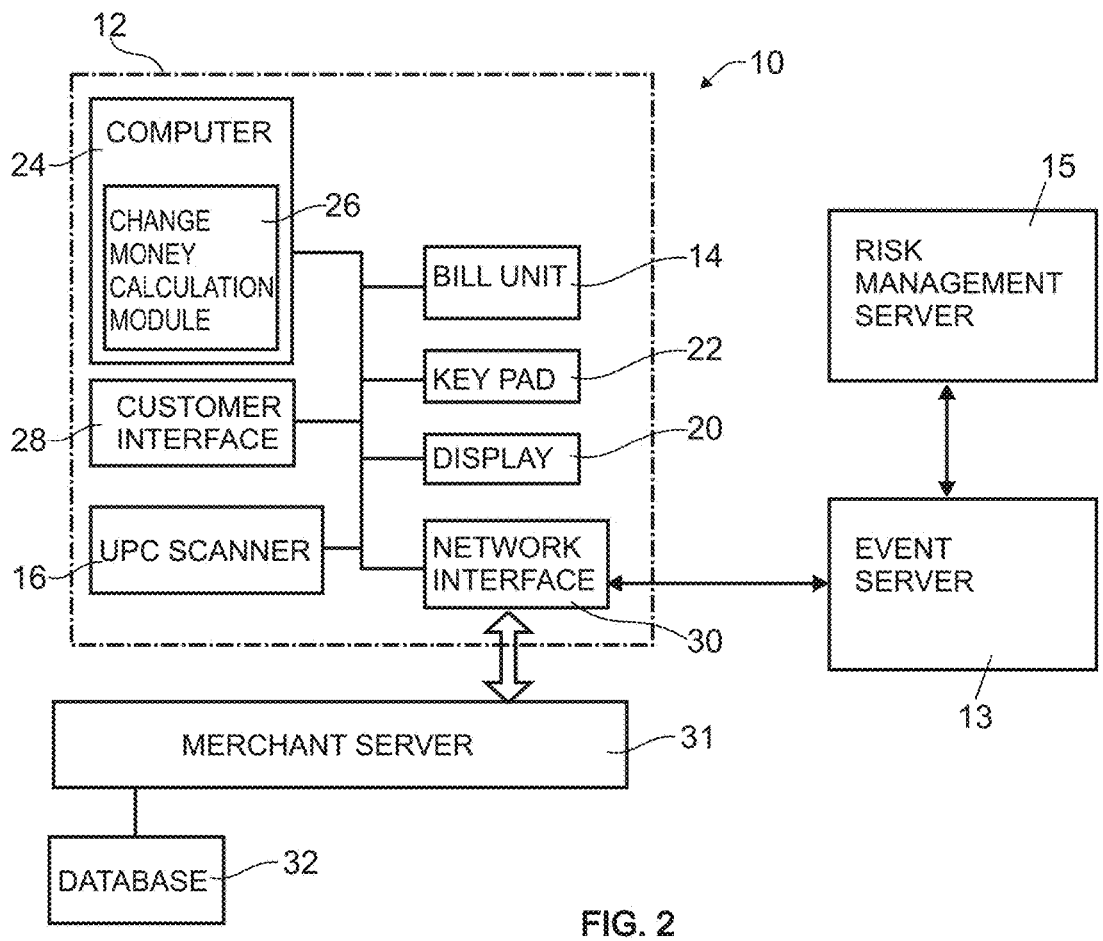
FIG. 2 shows a system diagram in accordance with the present invention.

FIG. 2 shows a system diagram of the point of sale terminal 10 of the present invention including the cash register 12. The cash register 12 includes a computer 24, which has a change money calculation module 26. The cash register 12 communicates with the customer interface 28 via a wired connection, or a wireless connection, for example. The cash drawer 14 has a bill unit for holding paper bills. The cash register key pad 22 and the cash register display 20 operatively connect with the computer 24 of the cash register 12.

The cash register 12 also communicates to a merchant server 31 through a network connection. The merchant server 31 includes a database 32 for storing customer information, such as club membership indicia, and product information including prices, product descriptions and UPC codes.

Customer information may include a customer's physical and electronic or email address, and phone number. Such information is typically provided to a point of sale merchant via a club membership, or discount account. The availability of the purchaser's electronic address or phone number enables the merchant operating the cash register to provide account and transactional information to the purchaser by electronic communications using the Internet or text messaging protocols, for example. The result of a sporting event, wager amount and payout can be sent to a customer via email or text messaging by the event server in the case where the customer is a winner.

Information that can be provided to the customer may include any or all of the transaction information recorded in the database 32, including the details about any wager, sporting event details, betting odds and payout. Sporting event details include commencement times and completion times. The database 32 may also store the amount of money spent by the purchaser at the business within any given time period or upon any specific transaction, the specific items purchased by the customer at each transaction, and the denominations and serial numbers of bills dispensed to the customer by the cash register 12 in making change at each transaction.

In one embodiment of the invention, the merchant server 31 is connected to the Internet to enable customers to download transactional information. This information can be downloaded from the Internet into a personal computer or hand-held device, and it can be used by the customer to manage cash transactions, view purchases and cash transactions by family members or dependents. This information can also be stored by the customer in a personal financial manager.

The event server 13 includes a controller having a program memory, a microcontroller or microprocessor (MP), a random-access memory (RAM) and an input/output (I/O) circuit, all of which may be interconnected via an address/data bus. The program memory of the controller may be read-only memory (ROM), a read/write or alterable memory, such as a hard disk. In the event a hard disk is used as a program memory, the address/data bus may comprise multiple address/data buses, which may be of different types, and there may be an I/O circuit disposed between the address/data buses.

The event server 13 connects via a network to the cash register 12 to communicate sporting event information to the cash register. Sporting event information includes estimated live sporting event commencement and completion times, which can be printed by the printer. In one embodiment, each sporting event includes an associated sporting event description such as an event code pre-assigned by the event server 13. Preferably, the event code is a number.

In one embodiment of the invention, the sporting event is a live sporting event. The live sporting event may be an animal race, such as a horse race. It can be appreciated, however, that the term "sporting event" is intended to be broadly construed to include any sporting event on which bets can be made.

The sporting event information is updated periodically. The cash register 12 receives sporting event information from the event server 13 and assigns an event code to the sporting event in cases where an event code is not pre-assigned by the event server 13. Optimally, a queue of live sporting events is maintained by the event server 13 and the commencement times are spaced less than three minutes apart, on average. In one embodiment the commencement times for the live sporting events are less than one minute apart, on average.

The risk management server 15 communicates with the event server 13 and calculates betting odds for each sporting event. The odds are calculated for any of a variety of bets. For example the risk management server can be configured with software for calculating proposition bets, parlays, progressive parlays, teasers, if-bets, run line, puck line or goal line bets, future wagers, and head-to-head bets. This is a short list of betting possibilities, and it can be appreciated that variants of each of these and other known, or to-be-developed, betting schemes can be used in accordance with the present invention.

Proposition bets are wagers made on a specific aspect of a sporting event. Examples include guessing the number of soccer goals each team scores, betting whether a particular player will score in a football game, or how many touchdowns a quarterback will throw. Another example is wagering that a baseball player on one team will accumulate more hits than another player on the opposing team.

Parlays involve multiple bets. If the better is successful with all of the multiple bets, this yields a payout much greater than the amount wagered. For example, a bettor could include four different wagers relating to a sporting event. If any of the four bets fails, the bettor loses. However, if all four bets win, the bettor receives a substantially higher payout i.e. 10-1 than if he made the four wagers separately.

Progressive parlays. A progressive parlay is a parlay having multiple bets, where successful bettors are rewarded even where some of the multiple bets loose. The benefit of a progressive parlay is that the probability of a payout increases even where some of the multiple bets lose. The drawback is that the payout typically is smaller than in a standard parlay.

Teasers. A teaser allows the bettor to bet on more than one sporting event, for example on a point spread for each of the sporting events. The teaser combines the point spread across the sporting events to yield a higher probability of success, but teasers yield a lower return on winning bets than separate wagers would yield.

"If" bets. An if bet consists of at least two bets in sequence. If the first bet is successful, then the better has a chance of winning the second bet, the third bet, and so on. Each time a bet is won, the magnitude of the potential payout increases.

Run line, puck line or goal line bets. These bets offer a fixed point spread that typically offers a higher payout for the expected sporting event winner and a lower payout for the other sporting event participant.

Future wagers. Future wagers normally have a long-term horizon measured in weeks or months. For example a future bet may be made early in the season, or before the season commences, that a baseball team will succeed in winning their division at the end of the season. Similarly a bet that a certain tennis player will win a particular championship title can be made before the championship contestants are even chosen. Odds for such a bet generally are typically pre-announced and expressed in a ratio of units paid to unit wagered. The contestant wagered upon might have 50-1 odds to win a championship, which means that the bet will pay 50 times the amount wagered if the contestant does win.

Head-to-Head. A head-to-head bet predicts competitors' results against each other, but not on the overall result of the event. One example includes horse races, where one may bet on two or three horses and their placement among the others.

The Risk Management Server 15 is programmed to calculate odds for particular bets made for the various classes of sporting events. The odds are communicated to the cash register via the event server 13. The cash register 12 offers choices of sporting events and selected types of bets that can be placed, depending on the nature of the sporting event.

Figure 3:
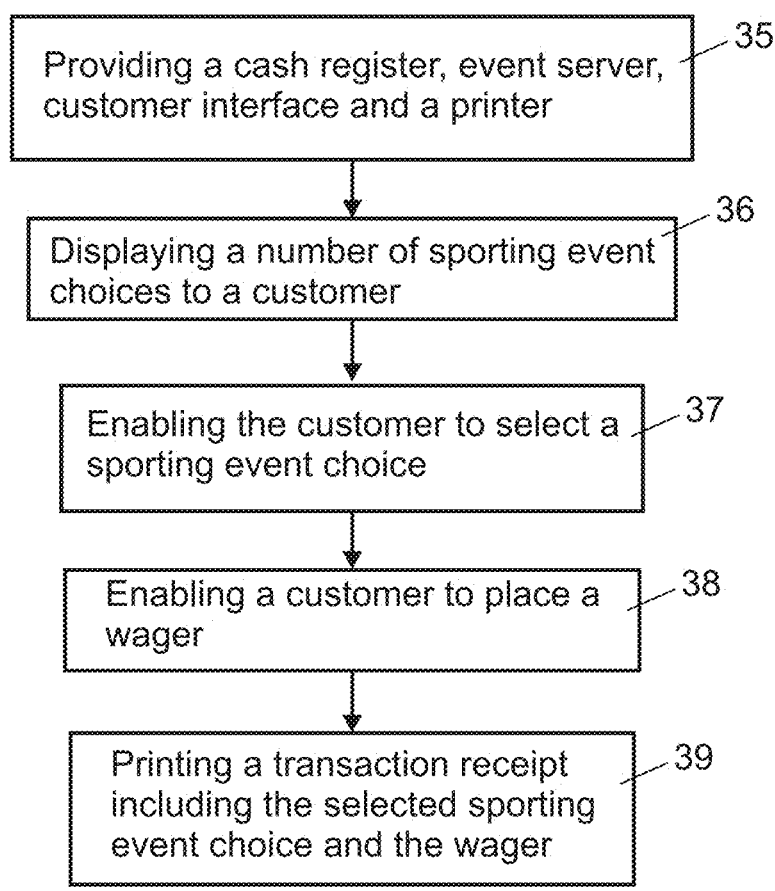
FIG. 3 shows a flowchart in accordance with the present invention.

FIG. 3 shows a flow chart of a method in accordance with the invention. The method includes the step 35 of providing a cash register, event server, customer interface, and a printer, the step 36 of displaying a number of sporting event choices to a customer, the step 37 of enabling the customer to select a sporting event choice, the step 38 of enabling a customer to place a wager, and the step 39 of printing a transaction receipt including a description of the selected sporting event and the wager.

The step 39 of printing a transaction receipt preferably includes printing an event code to identify the selected sporting event. The step 39 also preferably includes printing a transaction number, the odds associated with the wager and the amount of the wager. In one embodiment the amount of the wager is the change amount owed the customer from a cash transaction. Preferably, the step of printing includes printing a bar code on the receipt, which can be later read to facilitate payout.

The step 36 of displaying a number of sporting event choices, according to one aspect of the invention, includes displaying wager choices to enable the customer to choose both the sporting event, the amount wagered, and any of a number of wagering options. The procedure of selecting the sporting event, the type of wager and the amount wagered can take less than ten seconds for an experienced customer.

The step 37 of selecting a sporting event choice is accomplished by enabling the customer interface to display various sporting event choices and enabling the customer interface keypad, or display having a touch screen, to receive a selection from the customer.

The step 38 of enabling a customer to place a wager is accomplished by enabling the customer interface to display various wager choices, and enabling the customer interface keypad, or display having a touch screen, to receive a selection from the customer. Wager choices may include any wager methodology described herein, or any hybrid method of wagering not described. Wager choices also include an amount. The default amount is the change value due in a cash transaction. However, a customer may add to that number through a cash payment at the point of sale, and may swipe a credit or debit card to pay for a wager choice having an amount greater than change value. One advantage of the customer interface of the present invention is that betting options and payment can be handled through a single device.

Figure 4:
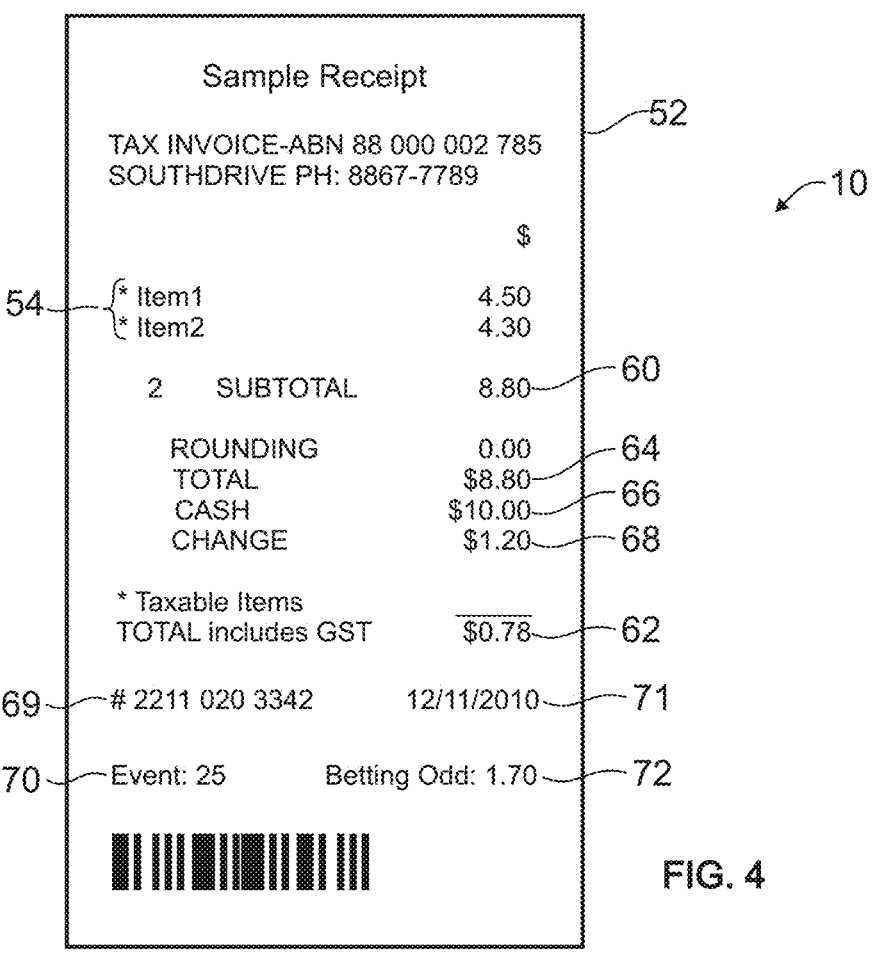
FIG. 4 shows a transaction receipt in accordance with the present invention.

FIG. 4 shows a transaction receipt printed from a point of sale terminal, in accordance with the present invention. The receipt 52 includes various printed information. In particular, a list of items purchased 54. Receipt 52 includes a transaction number 69 and a date 71 imprinted on the receipt 52. Receipt 52 also includes an event code 70 and betting odds 72. The receipt 52 also includes an imprinted subtotal 60, a tax line item 62, a total 64, an amount paid 66 and change 68.

The event code 70 may be a numeric or alphanumeric code associated with a particular sporting event as shown, or may be a textual description of the event.

The receipt includes a barcode 74 having the event code 70 and transaction number 69 encoded on the barcode 74. The amount of any bet is associated with the transaction number 69, and in this embodiment, the amount of the bet is the change line item 68. The barcode 74 is readable by a barcode scanner to determine payout, if any.

While the present invention is described herein in terms of various embodiments, it can be appreciated that numerous embodiments are possible, as well as combinations of described embodiments. In particular, any of a number of betting combinations can be presented to a customer via the customer interface. Accordingly the present invention should be limited only by the appended claims.

What is claimed is:
1. A method for printing transaction receipts, comprising:
accepting payments in a cash register, the cash register in communication with an event server, the event server communicates sporting event choices to the cash register, the cash register and event server being in communication with a risk management server;
the risk management server calculates odds for a variety of different classes of sporting events having a less than one minute duration;

providing a customer interface in communication with the cash register, the customer interface having a display for displaying at least one of said sporting event choices, and an input module for enabling a customer to select at least one of said sporting event choices, and place a wager on the selected sporting event choice;

electronically communicating with a printer to print a transaction receipt having a bar code that encodes the sporting event choice and the wager;

displaying sporting event choices on the customer interface display;

enabling, via the cash register, a customer to select a sporting event choice with the input module;

after the sporting event choice has been selected, displaying a sporting event on the customer interface display; and printing a transaction receipt, the transaction receipt includes a printed list of items purchased including a price for each item, and a sporting event description including a sporting event completion time, the transaction receipt further including a barcode to enable the transaction receipt to be scanned by a barcode reader.

2. The method as set forth in claim 1, wherein the cash register includes a bar code reader, and the method further comprises reading the barcode with the barcode reader.

3. The method set forth in claim 1, wherein the barcode encodes the transaction receipt including the sporting event result.

4. The method set forth in claim 1, wherein the sporting event is a horse race and the transaction receipt includes the name of a winning horse.

5. The method set forth in claim 4, wherein the step of displaying the sporting event entertains the customer.

6. The method set forth in claim 4, wherein the step of displaying the sporting event choices includes displaying sporting event commencement times that are less than one minute apart.

* * * * *